(12) United States Patent
Sasaki

(10) Patent No.: US 7,296,119 B2
(45) Date of Patent: *Nov. 13, 2007

(54) DATA MANAGING METHOD FOR MEMORY APPARATUS

(75) Inventor: Junko Sasaki, Tokyo (JP)

(73) Assignee: Sony Corporation (JP)

( * ) Notice: Subject to any disclaimer, the term of this patent is extended or adjusted under 35 U.S.C. 154(b) by 211 days.

This patent is subject to a terminal disclaimer.

(21) Appl. No.: 11/115,713

(22) Filed: Apr. 27, 2005

(65) Prior Publication Data

US 2005/0198465 A1    Sep. 8, 2005

Related U.S. Application Data

(63) Continuation-in-part of application No. 10/149,552, filed on Oct. 1, 2002, now Pat. No. 6,889,287.

(30) Foreign Application Priority Data

Oct. 13, 2000    (JP) ............... 314345/2000

(51) Int. Cl.
*G06F 12/06* (2006.01)
*G06F 11/00* (2006.01)

(52) U.S. Cl. .............. 711/115; 711/154; 711/202; 365/189.01

(58) Field of Classification Search ......... 711/100, 711/115, 154, 200, 202; 713/100; 714/5; 365/185.09, 189.01, 200
See application file for complete search history.

(56) References Cited

U.S. PATENT DOCUMENTS 5,226,168 A    7/1993  Kobayashi et al.
5,644,539 A *  7/1997  Yamagami et al. ......... 365/200
5,749,084 A    5/1998  Huck et al.
5,930,825 A    7/1999  Nakashima et al.
5,946,714 A    8/1999  Miyauchi et al.
5,963,738 A * 10/1999  Yamaki et al. ............. 713/100
5,968,187 A   10/1999  Robinson
5,991,517 A   11/1999  Harari et al.
6,031,758 A    2/2000  Katayama et al.
6,282,645 B1 * 8/2001  Yamaki ....................... 713/100

(Continued)

FOREIGN PATENT DOCUMENTS

EP    1209568    5/2002

(Continued)

*Primary Examiner*—Tuan V. Thai
(74) *Attorney, Agent, or Firm*—Lerner, David, Littenberg, Krumholz & Mentlik, LLP

(57) ABSTRACT

A block correlation table includes block addresses of unusable block portions in an irreversibly writeable memory and includes addresses of associated substitute block portions in the irreversibly writeable memory. A request for data stored at a logical address is received from a host processor. A physical address in the irreversibly writeable memory is calculated from the logical address using a fixed mathematical relation. The physical address is compared with the block addresses in the block correlation table. When the physical address does not match any of the block addresses in the table, the irreversibly writeable memory is referenced to read data stored at the physical address, and when the physical address matches one of the block addresses in the table, the irreversibly writeable memory is referenced to read data stored at the address of its associated substitute block portion. The read data is transmitted to the host processor.

11 Claims, 16 Drawing Sheets

U.S. PATENT DOCUMENTS

| | | |
|---|---|---|
| 6,341,085 B1 | 1/2002 | Yamagami et al. |
| 6,446,177 B1 | 9/2002 | Tanaka et al. |
| 6,591,329 B1 | 7/2003 | Kakinuma et al. |
| 6,675,276 B2 | 1/2004 | Schulze et al. |
| 2002/0085416 A1* | 7/2002 | Yamagami et al. .... 365/185.09 |
| 2003/0210587 A1 | 11/2003 | Yamagami et al. |

FOREIGN PATENT DOCUMENTS

| | | |
|---|---|---|
| JP | 3-97050 A1 | 4/1991 |
| JP | 3-156524 A1 | 4/1991 |
| JP | 2000-11677 A1 | 1/2000 |
| JP | 4-133149 A1 | 10/2000 |
| JP | 2000-285001 A1 | 10/2000 |
| WO | WO-97/32253 A1 | 9/1997 |
| WO | WO-9844420 | 10/1998 |
| WO | WO-9932977 | 7/1999 |
| WO | WO-00/50997 A1 | 8/2000 |

\* cited by examiner

DATA MANAGING METHOD FOR MEMORY APPARATUS

CROSS REFERENCE TO RELATED APPLICATIONS

This application is a continuation of U.S. application Ser. No. 10/149,552, filed Oct. 1, 2002, now U.S. Pat. No. 6,889,287 issued May 3, 2005, which is a national stage application under 35 U.S.C. § Oct. 371 of International Application Ser. No. PCT/JP01/08971, filed Oct. 12, 2001, which claims priority from Japanese Application Ser. No. 314345/2000, filed Oct. 13, 2000, the disclosures of which are incorporated herein by reference.

BACKGROUND OF THE INVENTION

The present invention relates to a data managing method for a memory apparatus using an irreversibly write memory.

In a system that uses an electrically erasable memory, with a precondition that data stored therein is rewritten, for a process that correlates logical information and physical information, physical information corresponding to all logical information is required. In addition, as another precondition, a process that correlates logical information and physical information using a redundant portion peculiar to such an electrically erasable memory is required. Moreover, since such an electrically erasable memory has a verify function that verifies written data by itself, it is not necessary to externally verify data.

Unlike with an electrically erasable memory, an irreversibly write memory of which data can be written one time is known. This memory is called a write once type memory or OTP (One Time Programmable ROM). Normally, an irreversibly write memory is non-volatile. In other words, once data is written to an irreversibly write memory, the data cannot be erased. Thus, after the power of an irreversibly write memory is turned off, data stored therein is retained.

When a data managing method for an electrically erasable memory is applied for the forgoing irreversibly write memory, the irreversibly write memory may not be effectively controlled. In addition, a correlation table for logical information and physical information results in a decrease of the memory capacity that the user can use.

It is therefore desirable to provide a data managing method that can be suitably and effectively applied to an irreversibly writeable memory.

SUMMARY OF THE INVENTION

In accordance with the invention, a method is provided for managing data stored in a memory apparatus having an irreversibly writeable memory. The method includes receiving a request from a host processor for data stored at a logical address; calculating a physical address in the irreversibly writeable memory from the logical address using a fixed mathematical relation; providing a block correlation table that includes block addresses of only unusable block portions in the irreversibly writeable memory and addresses of substitute block portions in the irreversibly writeable memory each associated with a specific one of the block addresses of the unusable block portions; comparing the physical address with the block addresses in the block correlation table; referencing the irreversibly writeable memory to read data stored at the physical address when the physical address does not match any of the block addresses in the block correlation table and referencing the irreversibly writeable memory to read data stored at the address of its associated substitute block portion when the physical address matches one of the block addresses in the block correlation table; and transmitting the read data to the host processor.

DETAILED DESCRIPTION

Figure 1:
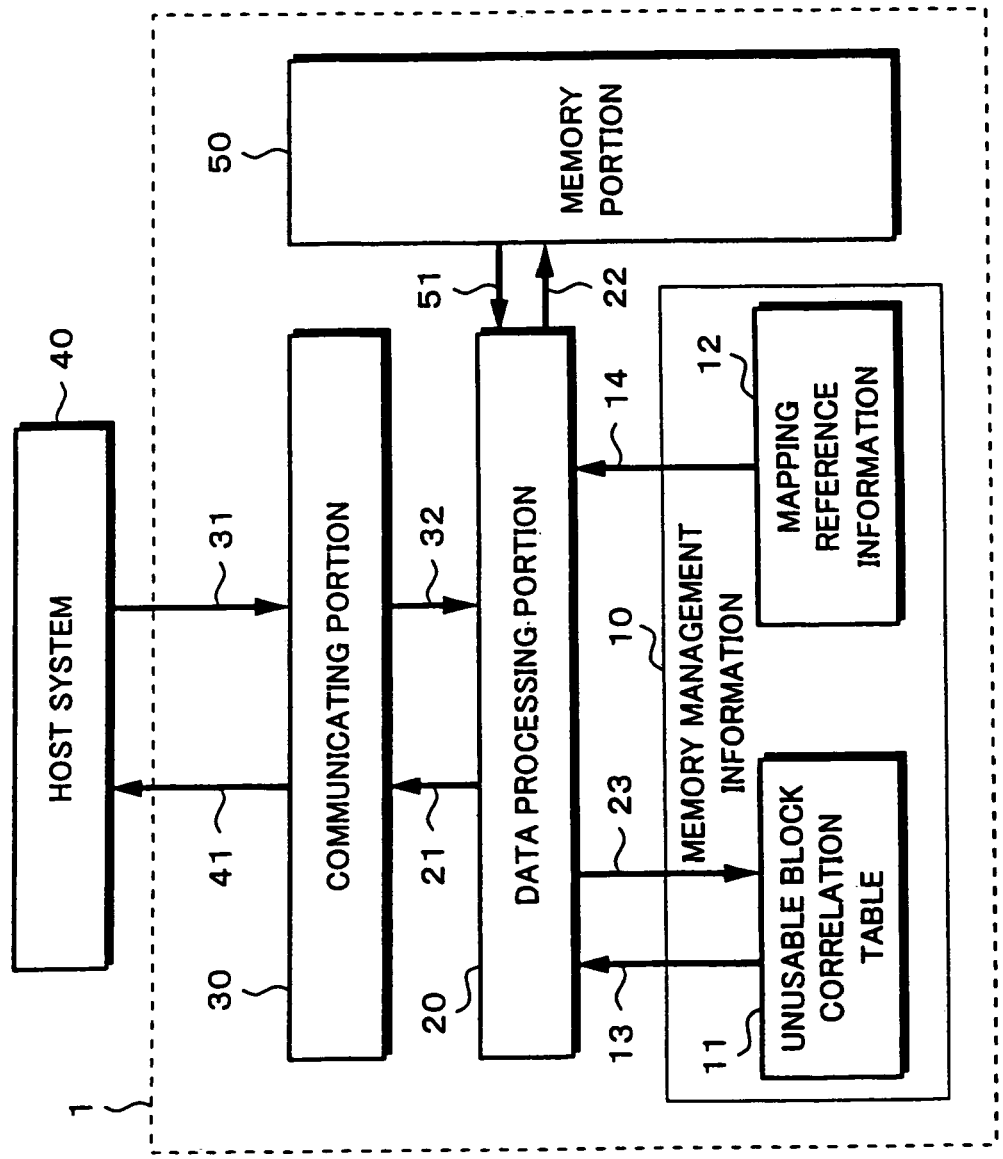
FIG. 1 is a block diagram showing an example of a system structure of a memory apparatus according to the present invention.

Next, with reference to the accompanying drawings, an embodiment of the present invention will be described. FIG. 1 shows the structure of the system according to the embodiment of the present invention. A host system 40 and a memory apparatus 1 are connected through communication paths 31 and 41. The memory apparatus 1 is a card shaped device that is removable from the host system 40. The memory apparatus 1 has a communicating portion 30 that communicates with the host system 40.

The memory apparatus 1 has a data processing portion 20 and a memory portion 50. The memory portion 50 is an irreversibly write memory that is called OTP and of which data can be written one time. The memory apparatus 1 is also a non-volatile semiconductor memory. In other words, data that has been written to the memory portion 50 cannot be erased. After the power of the memory apparatus 1 is turned off, the stored data is retained. In the memory portion 50, data is read and written in a predetermined data unit. The memory portion 50 has a boot area from which data is initially read by the host system when the memory is attached thereto. A variety of types of information such as attribute information are pre-recorded in the boot area.

The data processing portion 20 and the communicating portion 30 are connected through internal buses 21 and 32. Likewise, the data processing portion 20 and the memory portion 50 are connected through internal buses 22 and 51. The data processing portion 20 can access memory management information 10 through internal buses 13, 23, and 14. The memory management information 10 contains an unusable block correlation table 11 and mapping reference information 12.

Figure 2:
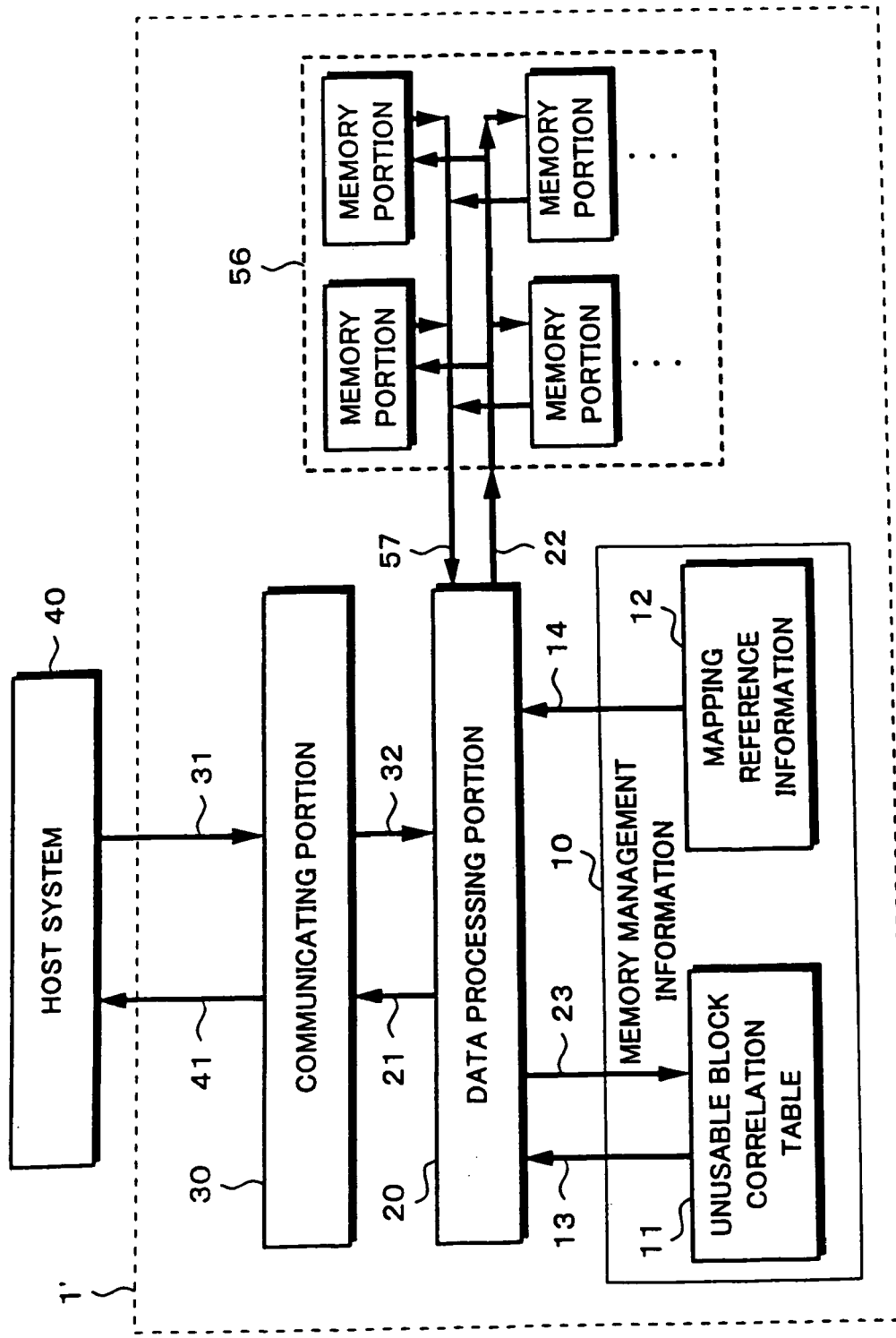
FIG. 2 is a block diagram showing another example of the system structure of the memory apparatus according to the present invention.

A memory apparatus 1' shown in FIG. 2 has a memory portion 56. The memory portion 56 has a plurality of memory cells each of which is an irreversibly write memory. Internal data buses 22 and 51 are disposed between a memory portion 56 and a data processing portion 20. In this example, memory management information 10 is stored in a non-volatile memory. In this case, the memory management information 10 may be stored in a memory integrated with a memory portion 50. Alternatively, the memory management information 10 may be stored in the memory portion 50, 56.

The host system 40 can write data to the memory portion 50, 56 of the memory apparatus 1, 1' and read data therefrom. An example of the host system 40 is a personal computer. Another example of the host system 40 is a digital electronic camera. A photographed picture is written to the memory apparatus 1, 1'. In addition, a picture is read from the memory apparatus 1, 1'. Another example of the host system 40 is an audio recording/reproducing apparatus. In this case, compressed audio data is written to the memory apparatus 1, 1'. In addition, compressed audio data is read from the memory apparatus 1, 1'.

Figure 3:
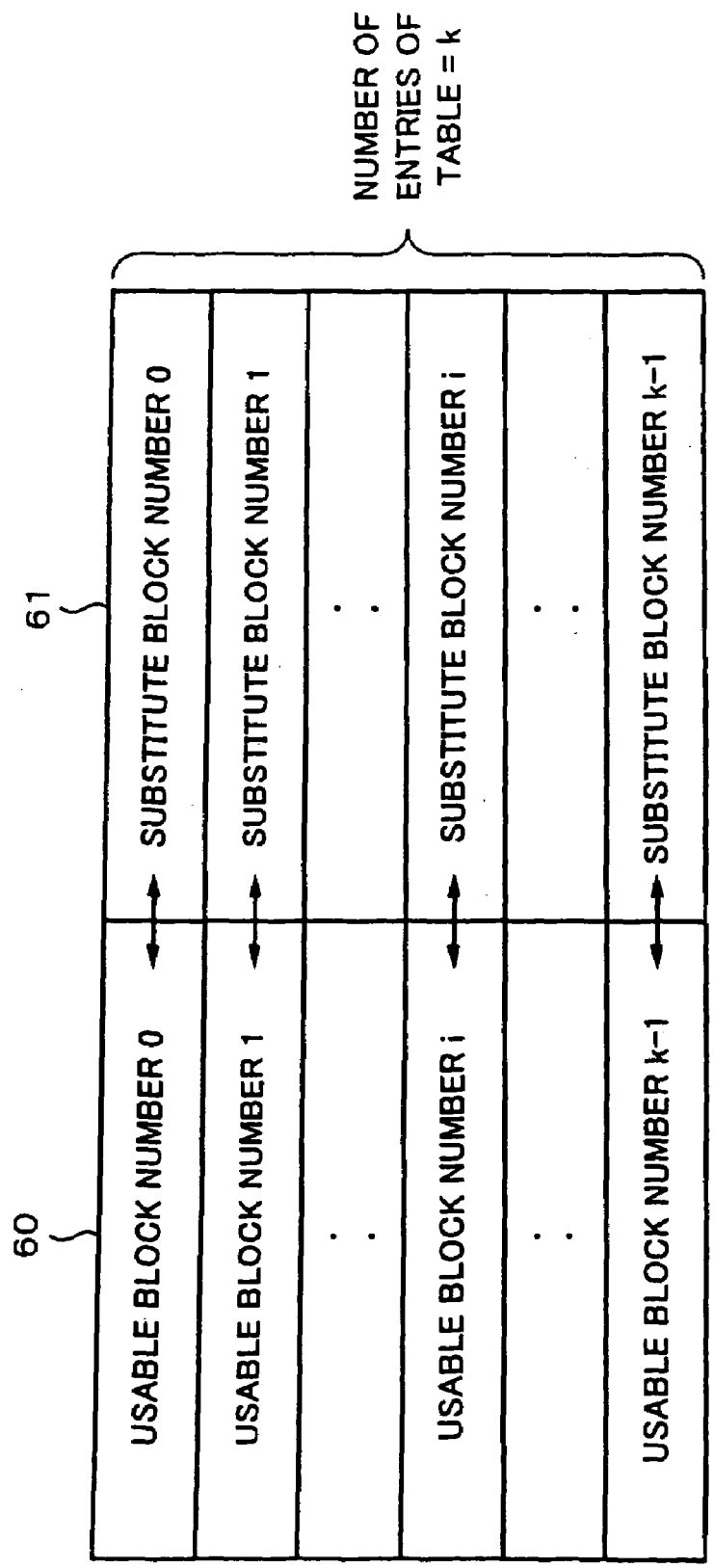
FIG. 3 is a schematic diagram for explaining an example of an unusable block correlation table.
Figure 4:
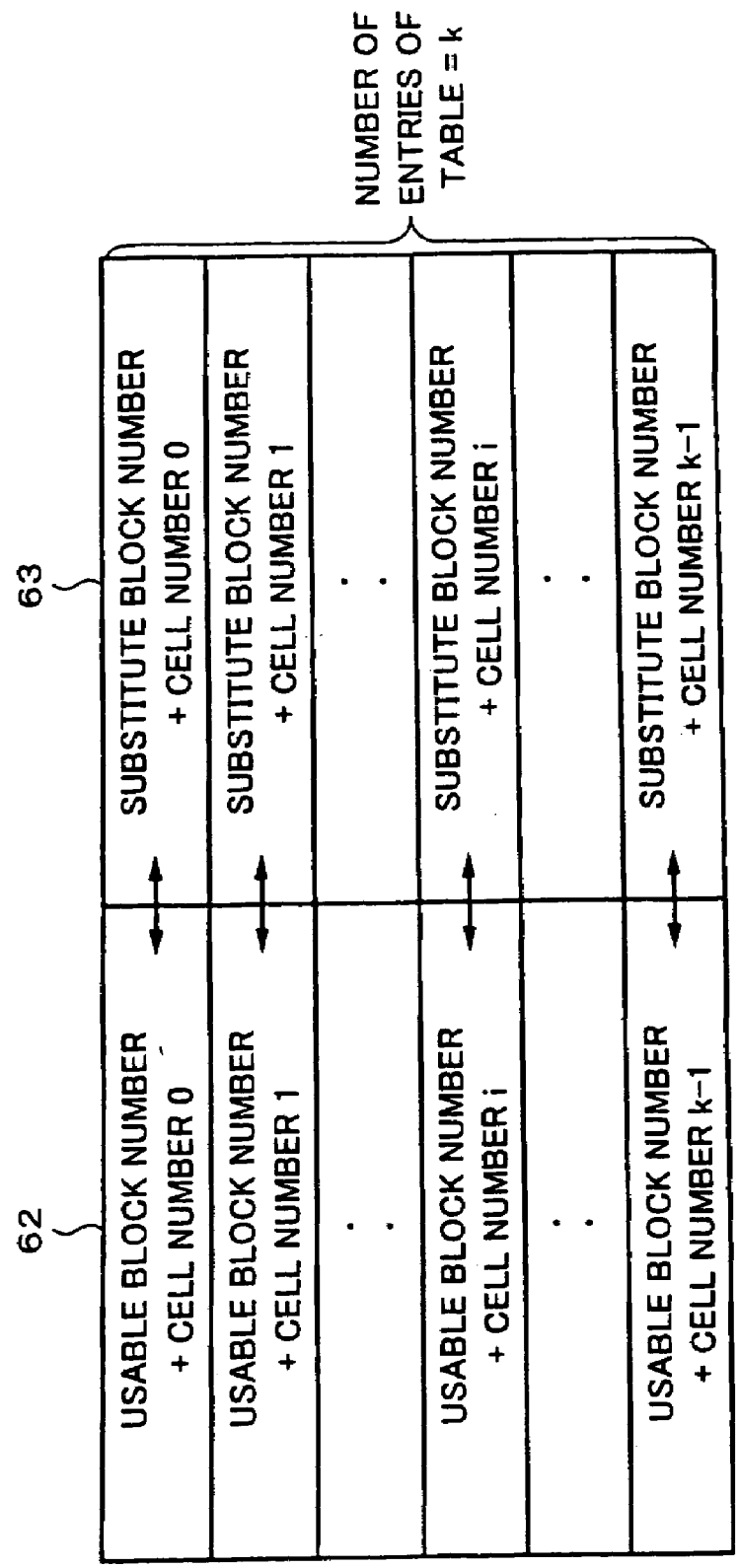
FIG. 4 is a schematic diagram for explaining another example of the unusable block correlation table.

FIG. 3 shows an example of the unusable block correlation table 11 of the memory apparatus 1 that has one memory portion 50. The table 11 has an unusable block number portion 60 and a substitute block number portion 61. The unusable block number portion 60 contains k unusable block numbers in succession. The substitute block number portion 61 contains substitute block numbers corresponding to unusable block numbers. FIG. 4 shows an unusable block correlation table 11 of the memory apparatus 1' shown in FIG. 2. The unusable block correlation table 11 of the memory apparatus 1' has an unusable block portion 62 and a substitute block number portion 63. The unusable block portion 62 contains unusable block numbers in succession. The substitute block number portion 63 contains substitute block numbers in succession. In addition, each of the unusable block portion 62 and the substitute block number portion 63 contain cell numbers that distinguish a plurality of memory cells.

The unusable block correlation table 11 is created by the data processing portion 20. In the memory apparatus 1 shown in FIG. 1, when the data processing portion 20 recognizes any unusable physical block in the memory portion 50, the data processing portion 20 sets the block number thereof to the unusable block number portion 60 through the internal bus 13, designates a substitute usable block number, and sets the designated block number to the substitute block number portion 61.

In the memory apparatus 1' shown in FIG. 2, when the data processing portion 20 recognizes any unusable physical block in the memory portion 56, the data processing portion 20 sets the block number and the cell number thereof to the unusable block number portion 62, designates a substitute usable block number and a cell number, and sets the designated block number and cell number to the substitute block number portion 63. In the memory apparatus 1' shown in FIG. 2, each cell may has an unusable block correlation table. In this case, the table is structured as shown in FIG. 3.

Figure 5:
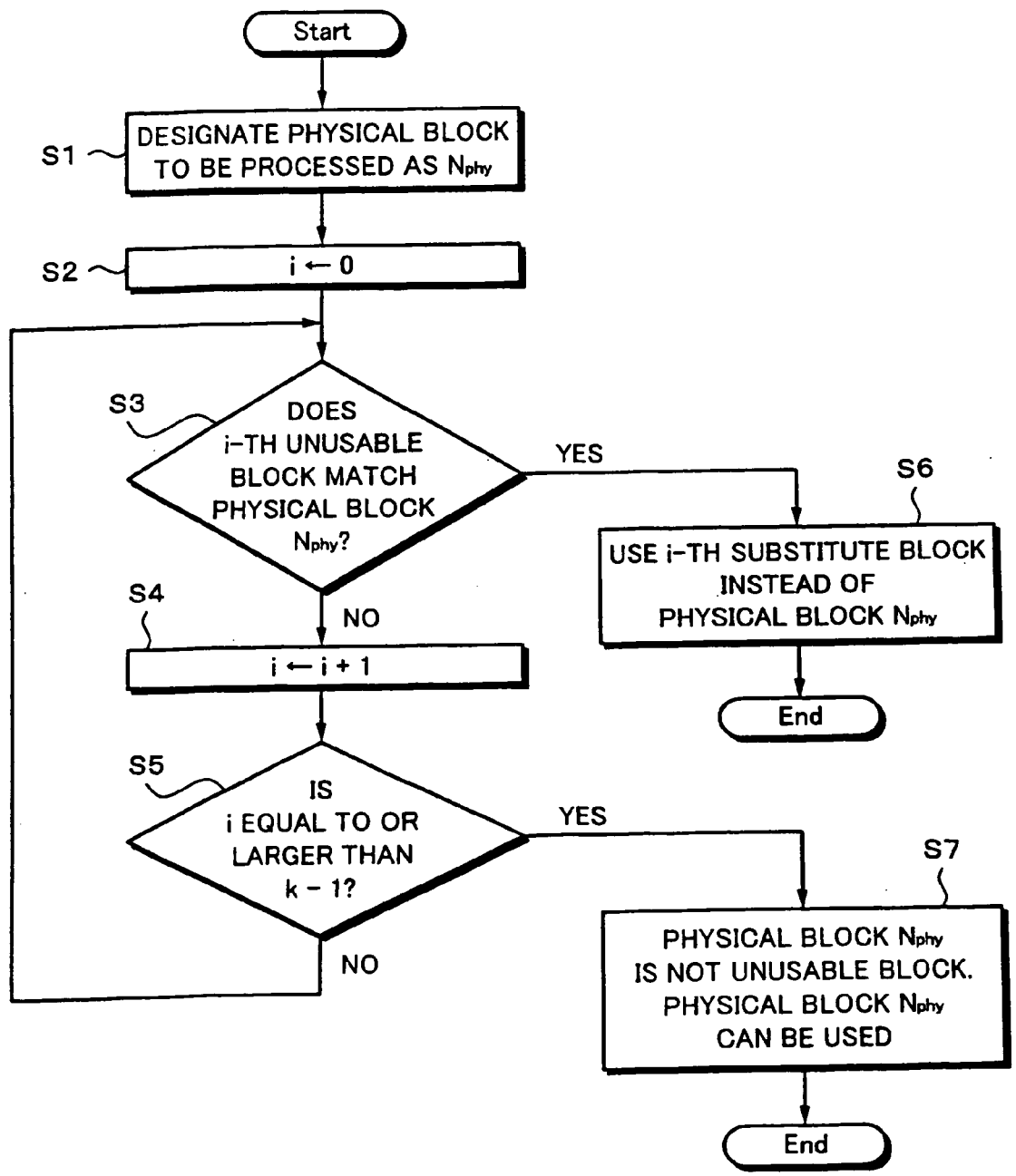
FIG. 5 is a flow chart showing an example of a referencing process for the unusable block correlation table.

Next, with reference to FIG. 5, a method for referencing the unusable block correlation table created in the forgoing manner will be described. At step S1, the physical block number to be processed is designated as $N_{phy}$. At step S2, i is initialized. At step S3, it is determined whether or not the i-th unusable block matches the physical block number $N_{phy}$. When they do not match, the flow advances to step S4. At step S4, i is incremented. At step S5, it is determined whether or not i is equal to or larger than (k−1). At steps S3, S4, and S5, it is determined whether or not the physical block number $N_{phy}$ is an unusable block number.

When the determined result at step S3 represents that the physical block number $N_{phy}$ matches the i-th unusable block, the flow advances to step S6. At step S6, an i-th substitute block is used instead of the physical block number $N_{phy}$. Thereafter, the process is completed. In contrast, when the determined result at step S5 represents that i is equal to or larger than (k−1), the flow advances to step S7. At step S7, the physical block number $N_{phy}$ is not an unusable block, but a usable block. Thereafter, the process is completed.

Figure 6:
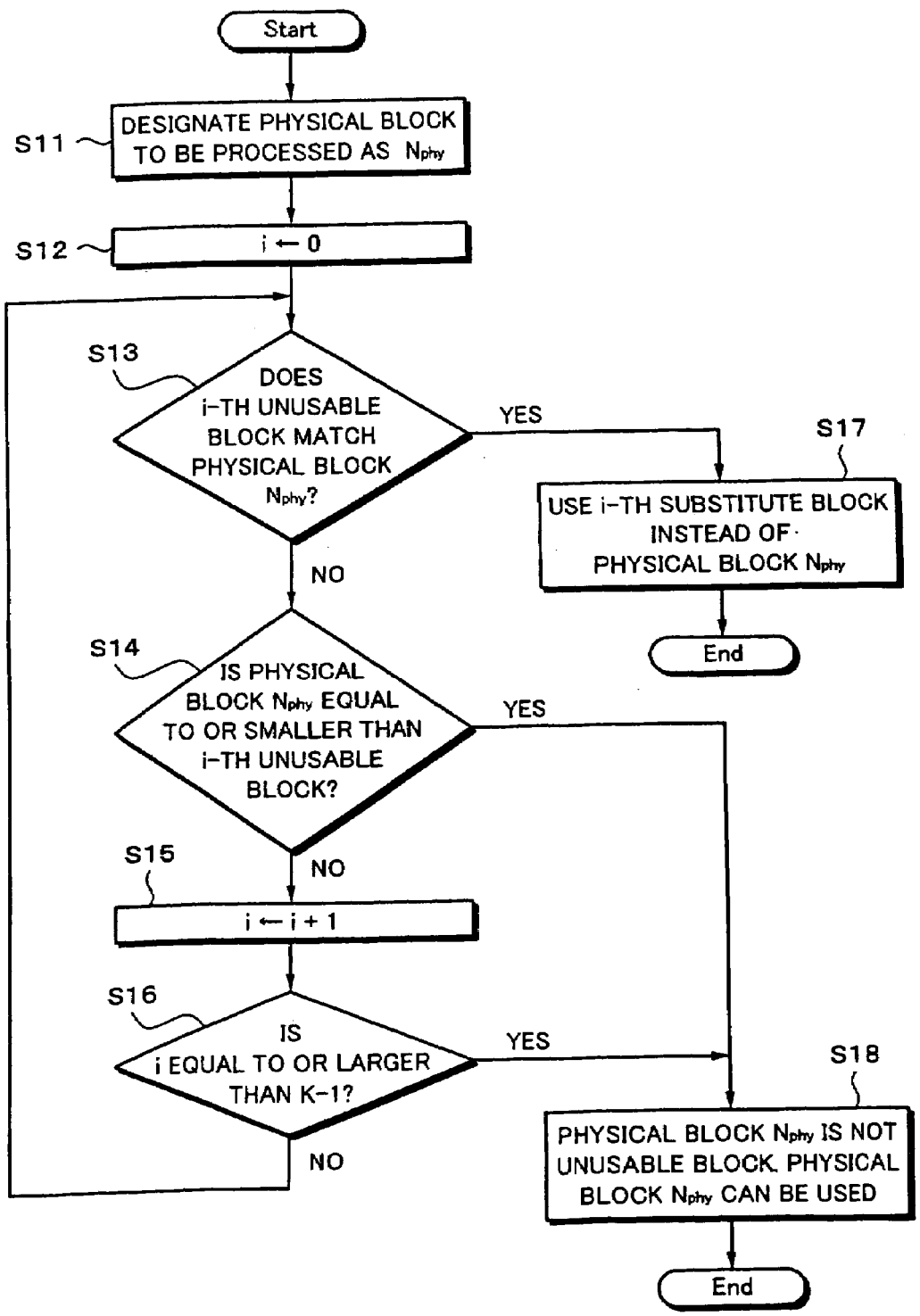
FIG. 6 is a flow chart showing another example of the referencing process of the unusable block correlation table.

When physical block numbers or logical information of the unusable block correlation table are sorted in the ascending order or descending order, the process that references the unusable block correlation table can be performed at high speed. FIG. 6 is a flow chart showing a high speed referencing process accomplished by sorting physical block numbers in the ascending order.

At step S11, a physical block number $N_{phy}$ is designated as an object to be processed. At step S12, i is initialized. At step S13, it is determined whether or not an i-th unusable block matches the physical block number $N_{phy}$. When they do not match, the flow advances to step S14. At step S14, it is determined whether or not the physical block number $N_{phy}$ is equal to or smaller than the i-th unusable block.

When the determined result at step S14 represents that the physical block number $N_{phy}$ is neither equal to nor smaller than the i-th unusable block, the flow advances to step S15. At step S15, i is incremented. At step S16, it is determined whether or not i is equal to or larger than (k−1) At steps S13, S14, S15, and S16, it is determined whether or not the physical block number $N_{phy}$ is an unusable block number.

When the determined result at step S13 represents that the physical block number $N_{phy}$ matches the i-th unusable block, the flow advances to step S17. At step S17, an i-th substitute block is used instead of the physical block number $N_{phy}$. Thereafter, the process is completed. When the determined result at step S14 represents that the physical block number $N_{phy}$ is equal to or smaller than the i-th unusable block, the flow advances to step S18. At step S18, the physical block number $N_{phy}$ is not an unusable block, but a usable block. Thereafter, the process is completed. When the determined result at step S16 represents that i is equal to or larger than (k−1), the flow advances to step S18. At step S18, the physical block number $N_{phy}$ can be used. Thereafter, the process is completed.

In the process shown in FIG. 6, at step S14, it is determined whether or not the physical block number $N_{phy}$ is equal to or smaller than an i-th unusable block. Since unusable blocks have been sorted in the ascending order, if the relation is satisfied, it can be determined that the physical block number $N_{phy}$ can be used without need to check the rest of the table. Thus, the process can be performed at high speed.

Figure 7:
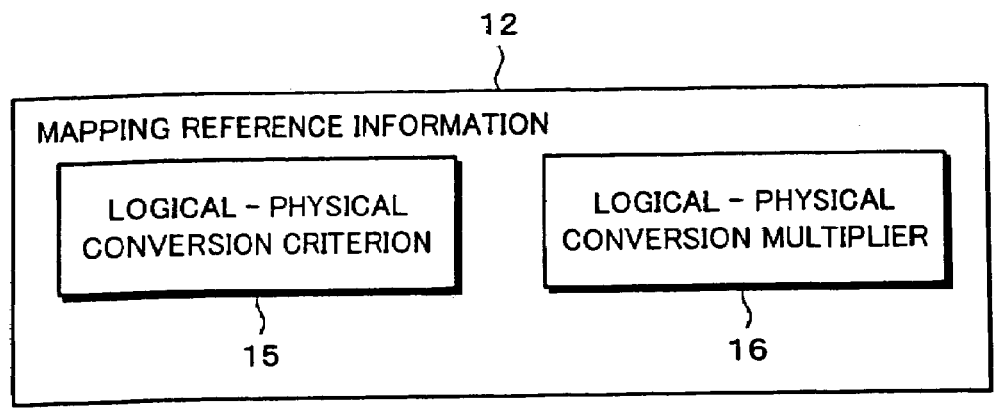
FIG. 7 is a schematic diagram showing an example of mapping reference information.

Next, the mapping reference information 12 of the memory apparatus 1 and 1' will be described. The mapping reference information 12 contains information necessary for converting logical information into physical information. FIG. 7 shows the mapping reference information 12 of the memory apparatus 1. The mapping reference information 12 is composed of a logical-physical conversion criterion 15 and a logical-physical conversion multiplier 16. The logical-physical conversion criterion 15 is in reality 0, +2, or the like. The logical-physical conversion multiplier 16 is in reality 4, ½, or the like.

Figure 8:
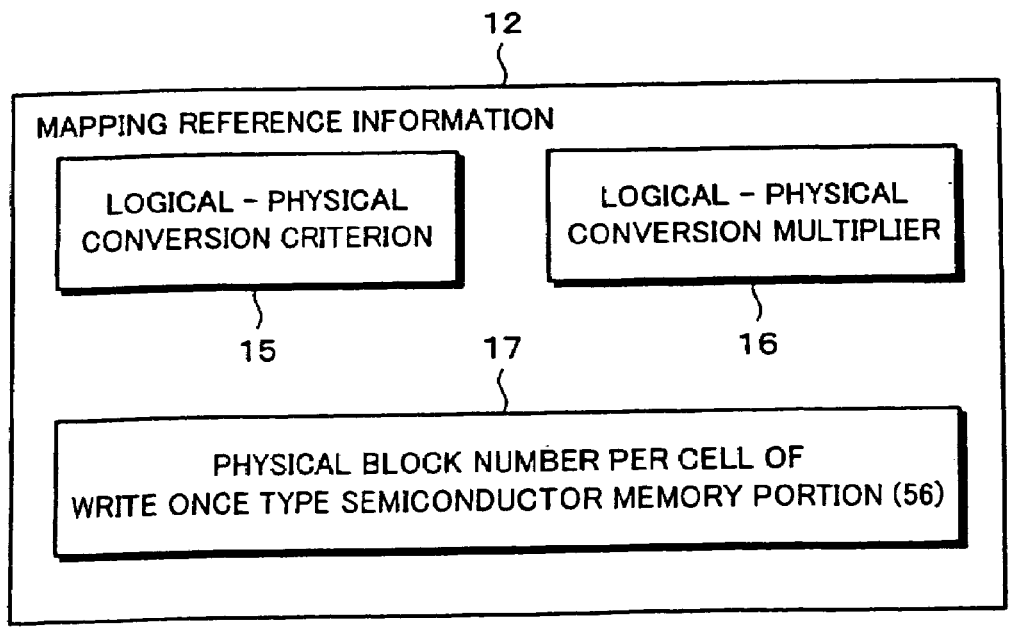
FIG. 8 is a schematic diagram showing another example of mapping reference information.

FIG. 8 shows the mapping reference information 12 of the memory apparatus 1'. As with the mapping reference information 12 of the memory apparatus 1, the mapping reference information 12 of the memory apparatus 1' has a logical-physical conversion criterion 15 and a logical-physical conversion multiplier 16. In addition, the mapping reference information 12 of the memory apparatus 1' has a physical block number 17 corresponding to the number of cells of the memory portion. The physical block number 17 is in reality 512, 1024, or the like.

The content of the mapping reference information 12 is set when the memory apparatus 1, 1' is structured. When the logical information unit is the same as the physical information unit and logical address 0 matches physical block number 0 in the memory apparatus 1, the logical-physical conversion criterion 15 and the logical-physical conversion multiplier 16 of the mapping reference information 12 are set to "0" and "1", respectively. When the logical information unit is twice as large as the physical information unit and logical address 0 corresponds to physical block numbers 4 and 5 in the memory apparatus 1, the logical-physical conversion criterion 15 and the logical-physical conversion multiplier 16 of the mapping reference information 12 are set to "4" and "2", respectively. When the logical information unit is ¼ times as small as the physical information unit and logical addresses 0, 1, 2, and 3 correspond to physical block number 3 in the memory apparatus 1, the logical-physical conversion criterion 15 and the logical-physical conversion multiplier 16 of the mapping reference information 12 are set to "3" and "¼", respectively.

When the logical information unit is the same as the physical information unit thereof, the number of physical blocks per cell of the memory portion is 1024, and logical address 0 corresponds to physical block number 2 in the memory apparatus 1', the logical-physical conversion criterion 15, the logical-physical conversion multiplier 16, and the physical block number 17 per cell of the mapping reference information 12 are set to "2", "1", and "1024", respectively.

With the forgoing mapping reference information 12, a converting process from logical information into physical information is performed. In the system that uses the memory apparatus 1 shown in FIG. 1, an equation that calculates the physical block number $N_{phy}$ with the logical address $N_{log}$ is expressed as follows.

$$N_{phy} = N_{log} \times N_{MUL} + N_{BASE}$$

where $N_{BASE}$ is a designated value of the logical-physical conversion criterion 15 and $N_{MUL}$ is a designated value of the logical-physical conversion multiplier 16.

In the system that uses the memory apparatus 1' shown in FIG. 2, an equation that calculates the physical block number $N_{phy}$ and the memory cell number $N_{cell}$ with the logical address $N_{log}$ can be expressed as follows.

$$N_{phy} = (N_{log} \times N_{MUL} + N_{BASE}) \% N_{BLKNUM}$$

(% represents an operation that obtains the remainder.)

$$N_{cell} = (N_{log} \times N_{MUL} + N_{BASE}) \div N_{BLKNUM}$$

where $N_{BASE}$ is a designated value of the logical-physical conversion criterion 15, $N_{MUL}$ is a designated value of the logical-physical conversion multiplier 16, and $N_{BLKNUM}$ is a designated value per cell.

The forgoing converting process from logical information into physical information is performed by the data processing portion 20. Alternatively, the converting process may be performed by the host system 40. In this case, as an initializing process, the host system 40 should read and retain the content of the memory management information 10 from the memory apparatus 1, 1'.

Figure 9:
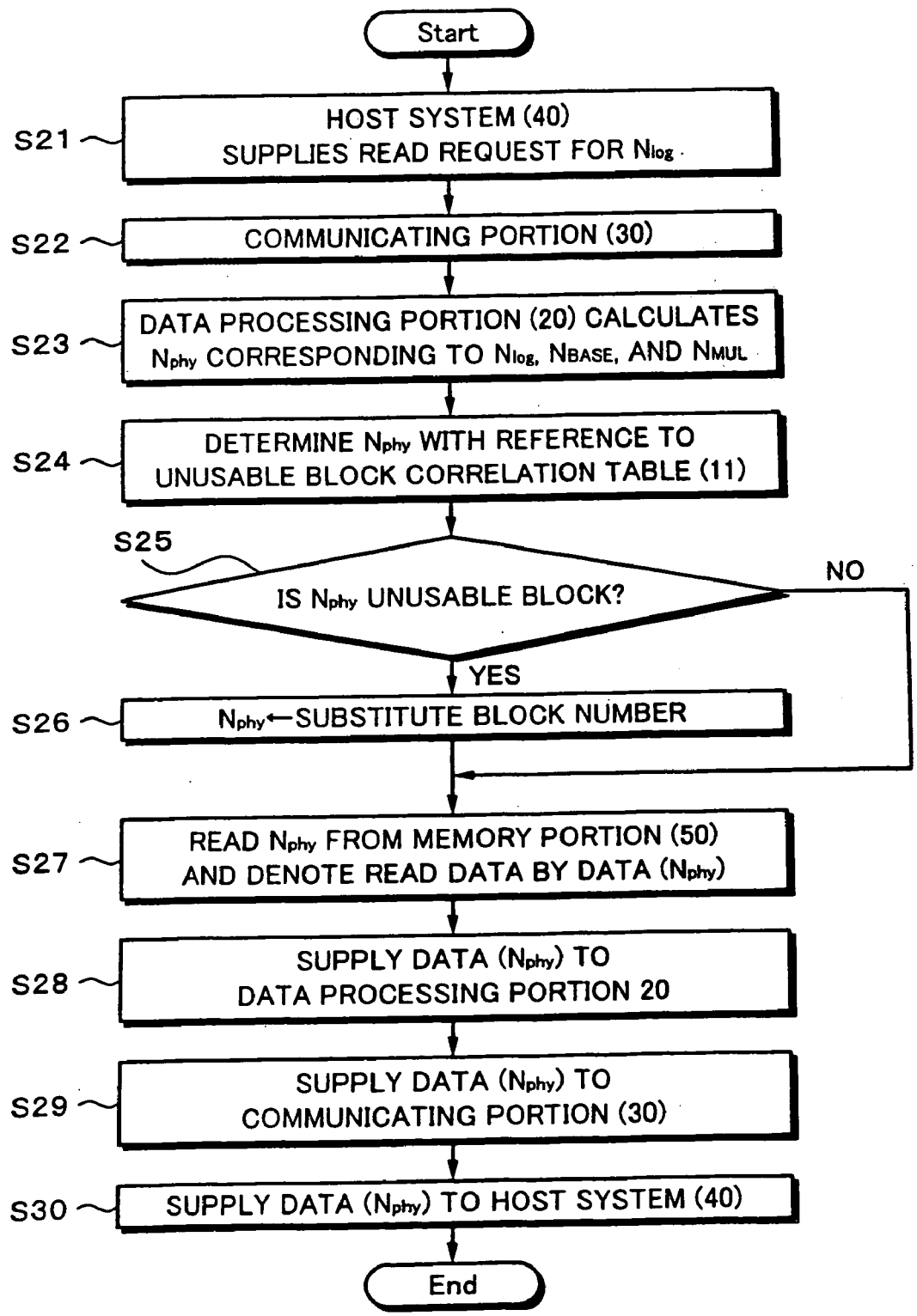
FIG. 9 is a flow chart showing an example of a read requesting process with logical information.

FIG. 9 is a flow chart showing the data reading process with the logical information $N_{log}$ in the case that the process that converts logical information into physical information is performed by the data processing portion 20 of the system shown in FIG. 1. At step S21, a data read request for the logical address $N_{log}$ is supplied from the host system 40 to the memory apparatus 1. The data processing portion 20 receives the read request through the communicating portion 30 (at step S22).

At step S23, the data processing portion 20 calculates the physical block number $N_{phy}$ corresponding to the logical address $N_{log}$ and the designated values $N_{BASE}$ and $N_{MUL}$ of the mapping reference information 12. At step S24, the data processing portion 20 determines that the physical block number $N_{phy}$ is not an unusable block with reference to the unusable block correlation table 11. This process corresponds to the process shown in FIG. 5 or FIG. 6. At step S25, it is determined whether or not the physical block number $N_{phy}$ is an unusable block. When the physical block number $N_{phy}$ is an unusable block, the flow advances to step S26. At step S26, a substitute block number is used instead of the physical block number $N_{phy}$.

At step S27, the physical block number $N_{phy}$ is read from the memory portion 50. The read data is denoted by DATA ($N_{phy}$) DATA ($N_{phy}$) is supplied to the data processing portion 20 (at step S28). DATA ($N_{phy}$) is supplied from the data processing portion 20 to the communicating portion 30 (at step S29). The communicating portion 30 supplies the read data DATA ($N_{phy}$) to the host system 40 (at step S30).

Figure 10:
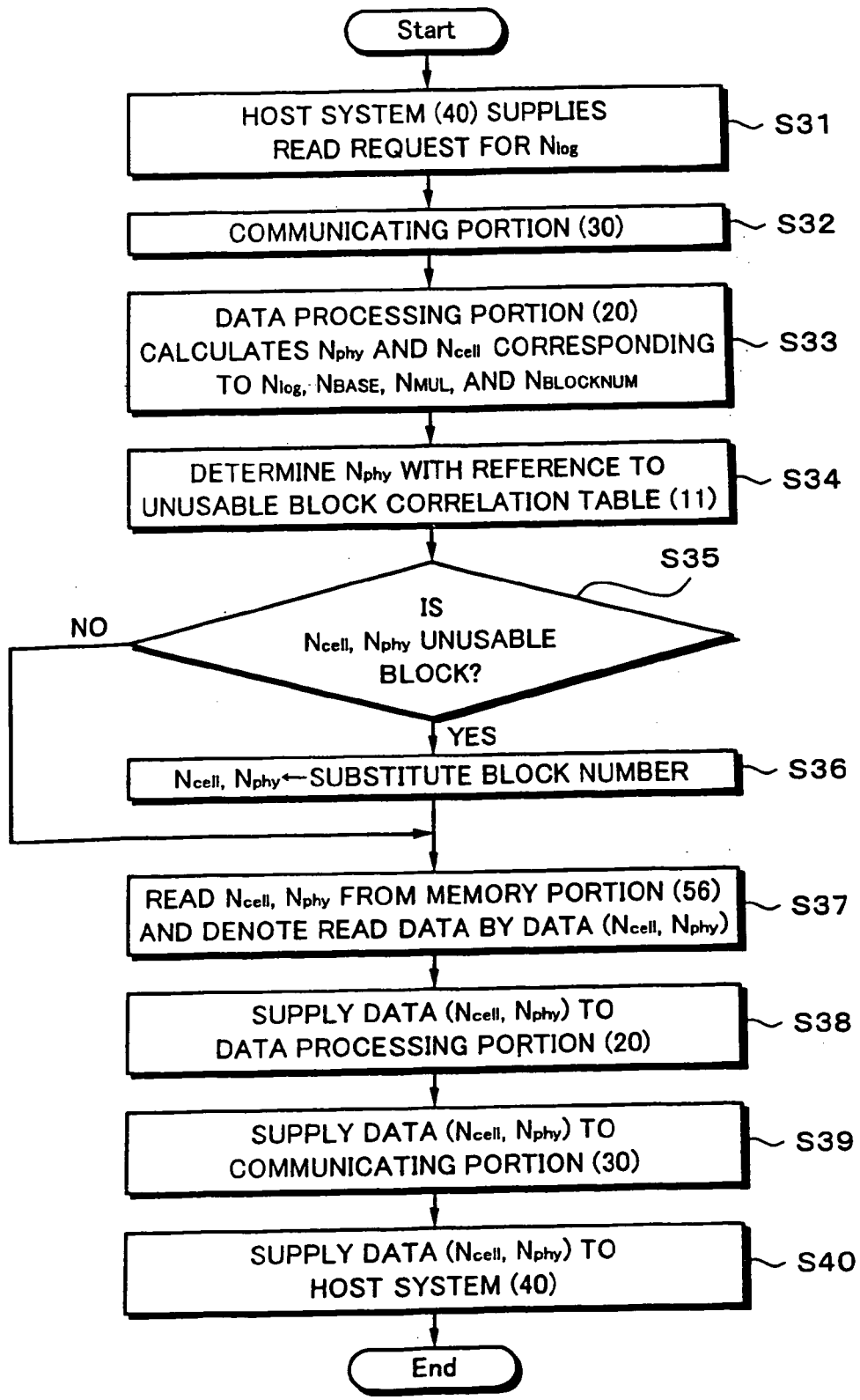
FIG. 10 is a flow chart showing another example of the read requesting process with logical information.

FIG. 10 is a flow chart showing the data read process with the logical information $N_{log}$ in the case that the process that converts logical information into physical information is performed by the data processing portion 20 of the system shown in FIG. 2. Steps S21, S22, and S23 shown in FIG. 9 correspond to steps S31, S32, and S33 shown in FIG. 10, respectively. At step S33, the data processing portion 20 calculates the physical block number $N_{phy}$ and the cell number $N_{cell}$ corresponding to the logical address $N_{log}$ and the designated values $N_{BASE}$, $N_{MUL}$, and $N_{BLKNUM}$ of the mapping reference information 12.

Steps S24, S25, S26, S27, S28, S29, and S30 shown in FIG. 9 correspond to steps S34, S35, S36, S37, S38, S39, and S40 shown in FIG. 10, respectively. In FIG. 10, since the memory portion 56 is composed of a plurality of memory cells, the cell number $N_{cell}$ that designates a cell is used in addition to the physical block number $N_{phy}$.

Figure 11:
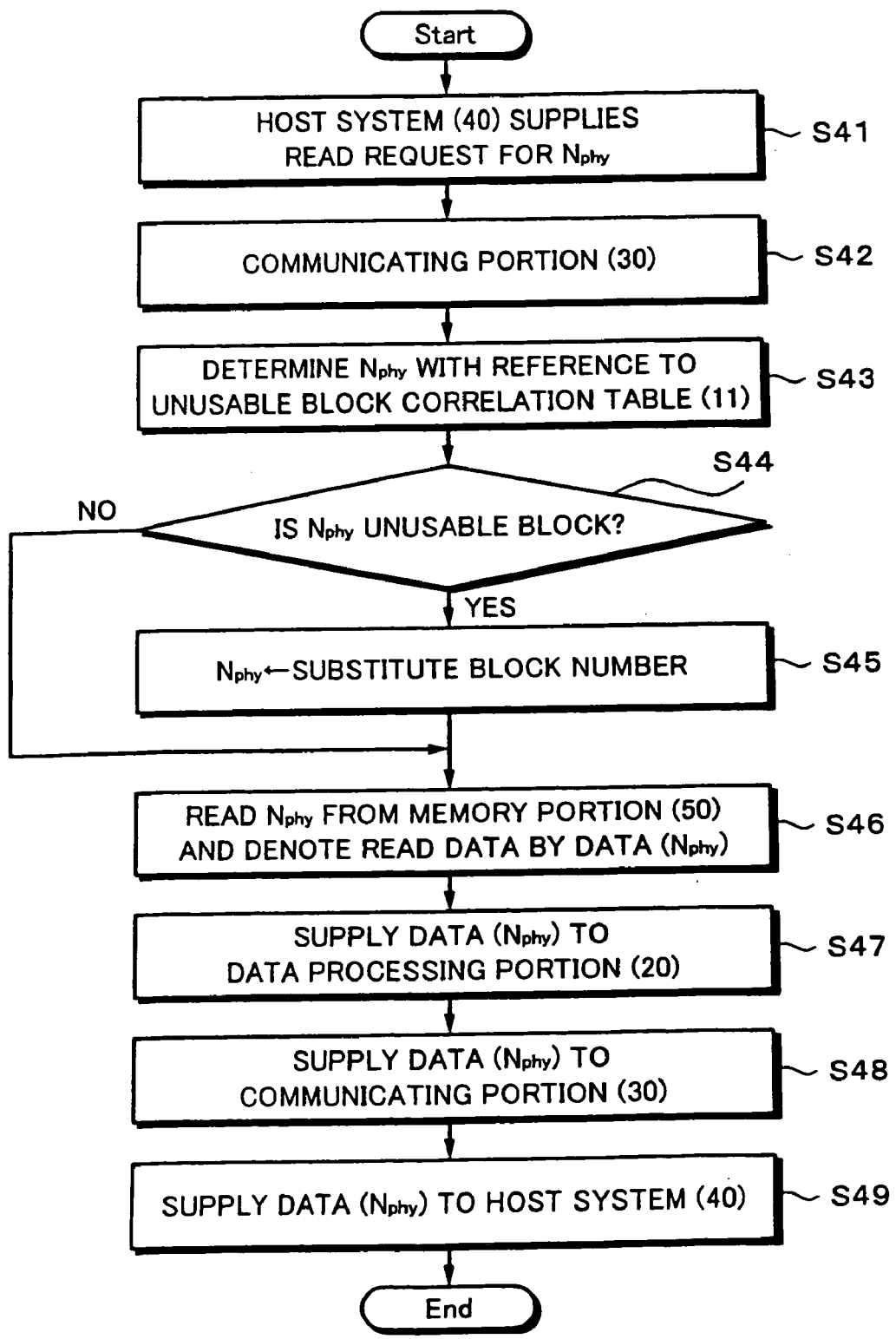
FIG. 11 is a flow chart showing an example of the read requesting process with physical information in the case that the unusable block correlation table is referenced by the memory apparatus.

FIG. 11 is a flow chart showing the data reading process with the logical information $N_{log}$ in the case that the process that converts logical information into physical information is performed by the host system 40 in the system shown in FIG. 1. As an initializing process, the host system 40 supplies a read request for the mapping reference information 12 to the memory apparatus 1. The memory apparatus 1 supplies the mapping reference information 12 to the host system 40. The host system 40 converts a logical address into the physical block number $N_{phy}$ corresponding to the mapping reference information 12. Thus, at step S41, the host system 40 supplies a data read request for the physical block number $N_{phy}$ to the memory apparatus 1. The data processing portion 20 receives the read request through the communicating portion 30 (at step S42).

At step S43, the data processing portion 20 determines that the physical block number $N_{phy}$ is not an unusable block with reference to the unusable block correlation table 11. At step S44, it is determined whether or not the physical block number $N_{phy}$ is an unusable block. When the physical block number $N_{phy}$ is an unusable block, the flow advances to step S45. At step S45, a substitute block number is used instead of the physical block number $N_{phy}$.

At step S46, the physical block number $N_{phy}$ is read from the memory portion 50. The read data is denoted by DATA ($N_{phy}$). DATA ($N_{phy}$) is supplied to the data processing portion 20 (at step S47). The data processing portion 20 supplies DATA ($N_{phy}$) to the communicating portion 30 (at step S48). The communicating portion 30 supplies the read data DATA ($N_{phy}$) to the host system 40 (at step S49).

Figure 12:
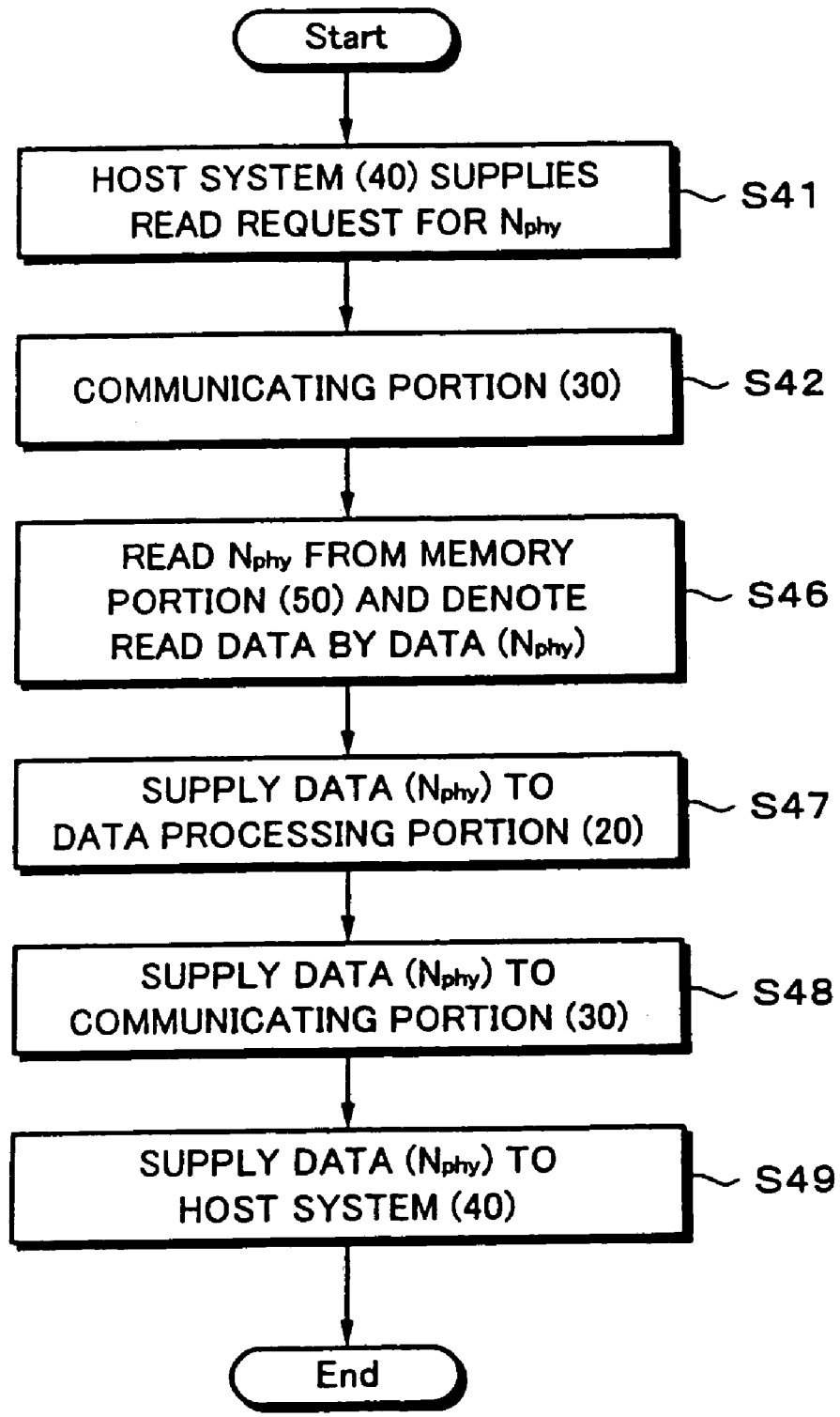
FIG. 12 is a flow chart showing an example of the read requesting process with physical information in the case that the unusable block correlation table is referenced by a host system.

FIG. 12 is a flow chart showing the data reading process with the logical information $N_{log}$ in the case that the process that converts logical information into physical information is performed by the host system 40 in the system shown in FIG. 1. In the process shown in FIG. 12, the host system 40 converts a logical address into the physical block number $N_{phy}$. In addition, the host system 40 performs a referencing process for the unusable block correlation table obtained from the memory apparatus 1. Thus, the referencing process for the unusable block correlation table shown in FIG. 11 (at steps S43, S44, and S45) is not required in FIG. 12. Except for this point, the process shown in FIG. 12 is the same as the process shown in FIG. 11. For simplicity, in FIG. 12, similar steps to those in FIG. 11 are denoted by similar reference numerals and their description will be omitted.

Figure 13:
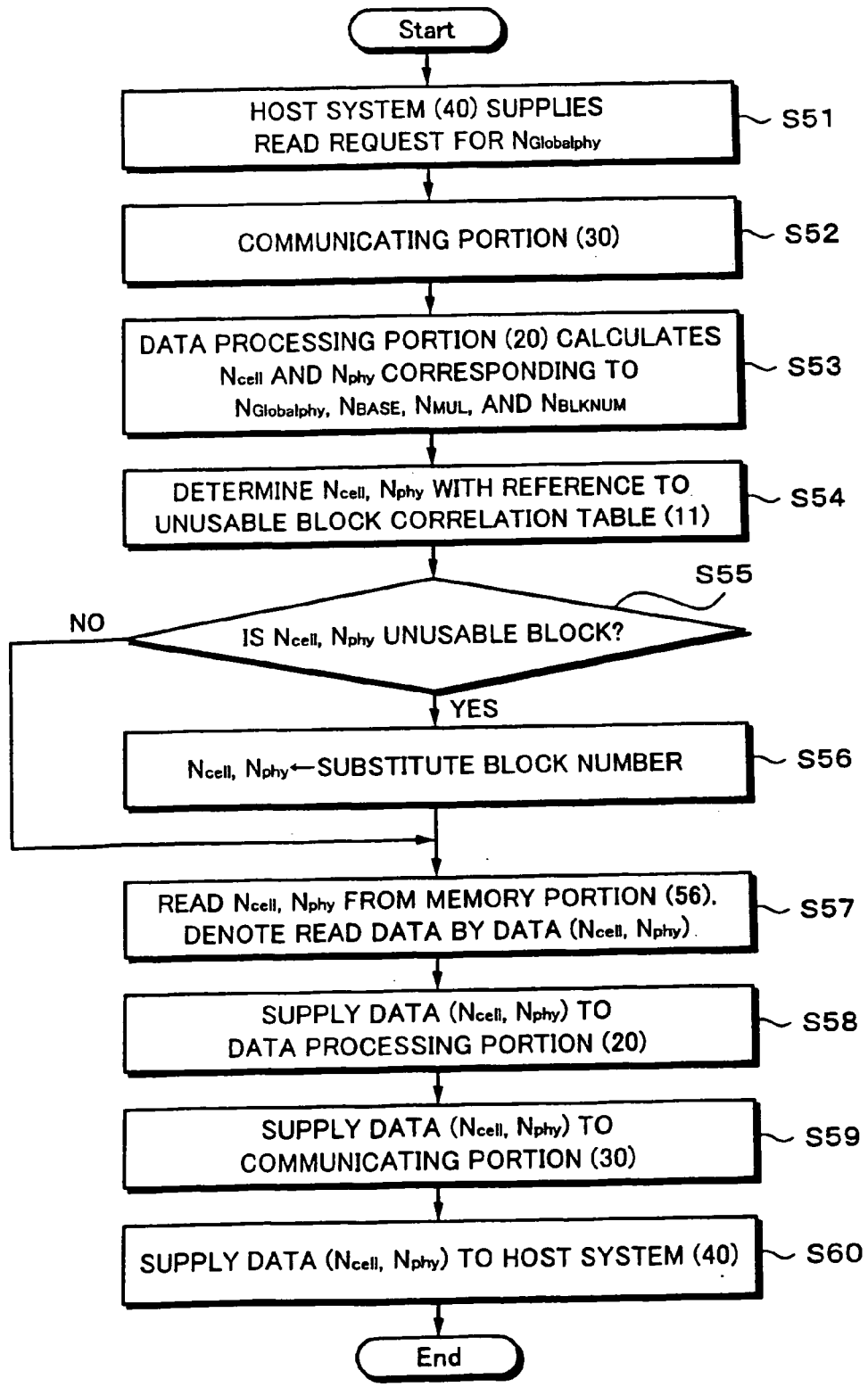
FIG. 13 is a flow chart showing an example of the read requesting process with physical information in the case that a cell number is calculated and the unusable block correlation table is referenced by the memory apparatus.

FIG. 13 is a flow chart showing a data reading process with physical information $N_{Globalphy}$ supplied from the host system 40 in the system shown in FIG. 2. $N_{Globalphy}$ is a value of which the physical information $N_{phy}$ and $N_{cell}$ are added as a numeric value. At step S51, the host system 40 supplies a data read request for physical information $N_{Globalphy}$ to the memory apparatus 1. The data processing portion 20 receives the read request through the communicating portion 30 (at step S52).

At step S53, the data processing portion 20 calculates physical information $N_{phy}$ and $N_{cell}$ corresponding to $N_{Globalphy}$ and designated values $N_{BASE}$, $N_{MUL}$ and $N_{BLKNUM}$ of the mapping reference information 12. At step S54, the data processing portion 20 determines that the physical information $N_{phy}$, $N_{cell}$ is not an unusable block with reference to the unusable block correlation table 11. At step S55, it is determined whether or not $N_{phy}$, $N_{cell}$ is an unusable block. When $N_{phy}$, $N_{cell}$ is an unusable block, the flow advances to step S56. At step S56, a substitute block number is used instead of $N_{phy}$, $N_{cell}$.

At step S57, physical information $N_{phy}$, $N_{cell}$ is read from the memory portion 56. The read data is denoted by DATA ($N_{cell}$, $N_{phy}$). DATA ($N_{cell}$, $N_{phy}$) is supplied to the data processing portion 20 (at step S58). The data processing portion 20 supplies DATA ($N_{cell}$, $N_{phy}$) to the communicating portion 30 (at step S59). The communicating portion 30 supplies the read data DATA ($N_{cell}$, $N_{phy}$) to the host system 40 (at step S60).

Figure 14:
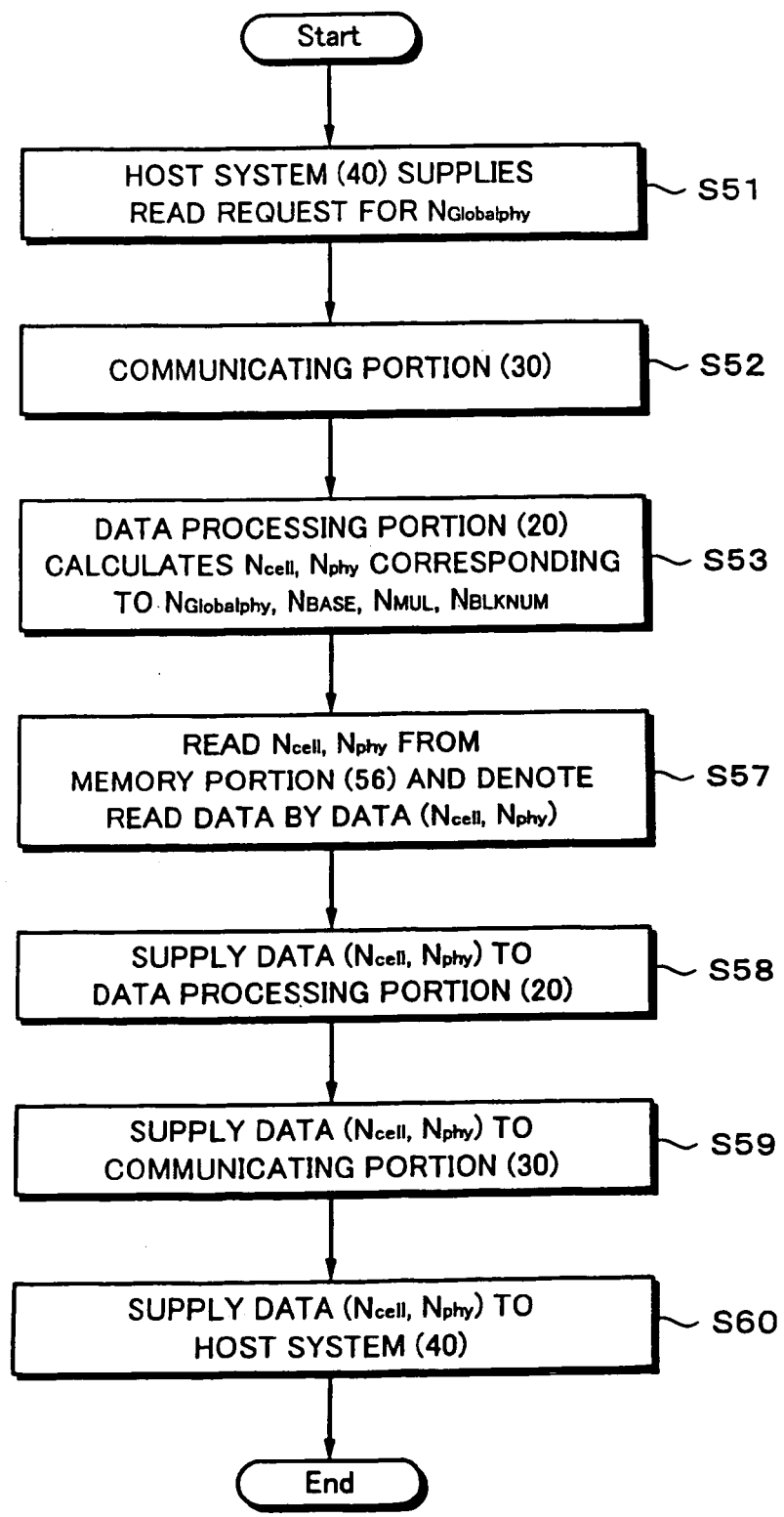
FIG. 14 is a flow chart showing an example of the read requesting process with physical information in the case that a cell number is calculated by the memory apparatus and the unusable block correlation table is referenced by the host system.
Figure 15:
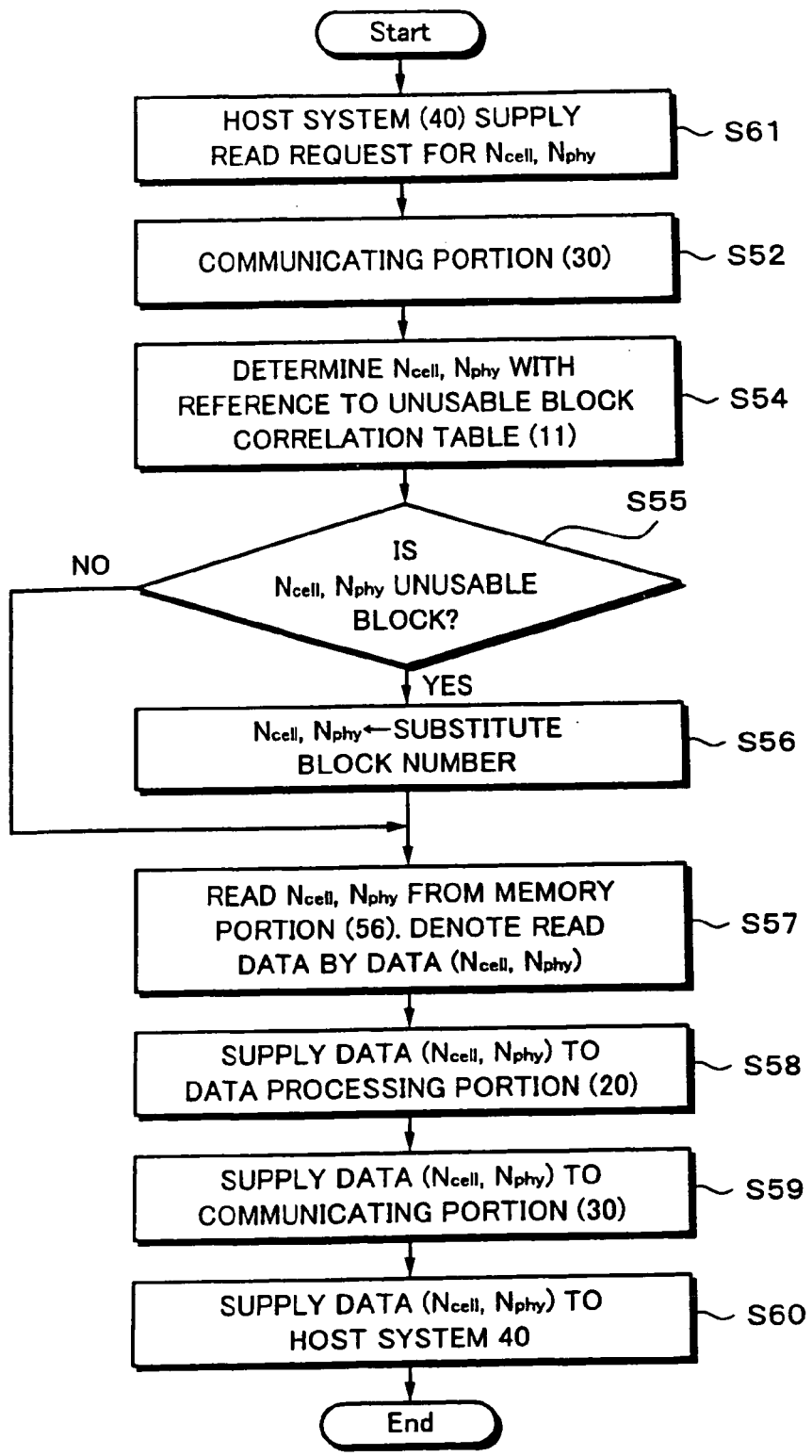
FIG. 15 is a flow chart showing an example of the read requesting process with physical information in the case that the unusable block correlation table is referenced by the memory apparatus.

FIG. 14 is a flow chart showing a data reading process with physical information $N_{Globalphy}$ supplied from the host system 40 in the system shown in FIG. 2. In the process shown in FIG. 14, the host system 40 performs a referencing process for the unusable block correlation table. Thus, in the process shown in FIG. 14, the referencing process for the unusable block correlation table (at steps S54, S55, and S56) shown in FIG. 13 is not required. Except for this point, the process shown in FIG. 15 is the same as the process shown in FIG. 13. For simplicity, in FIG. 14, similar steps to those in FIG. 13 are denoted by similar reference numerals and their description will be omitted.

FIG. 15 is a flow chart showing a data reading process with physical information $N_{cell}$, $N_{phy}$ supplied from the host system 40 in the system shown in FIG. 2. At step S61, the host system 40 supplies a data read request for physical information $N_{cell}$, $N_{phy}$ to the memory apparatus 1. In the process shown in FIG. 13, physical information $N_{Globalphy}$ is used. In contrast, in the process shown in FIG. 15, the host system 40 calculates physical information $N_{cell}$, $N_{phy}$ that represents a cell number and a block number. This physical information is supplied to the memory apparatus 1. Thus, step S53 at which $N_{cell}$, $N_{phy}$ are calculated shown in FIG. 13 is not required. Except for this point, the process shown in FIG. 15 is the same as the process shown in FIG. 13. For simplicity, in FIG. 15, similar steps to those in FIG. 13 are denoted by similar reference numerals and their description will be omitted.

Figure 16:
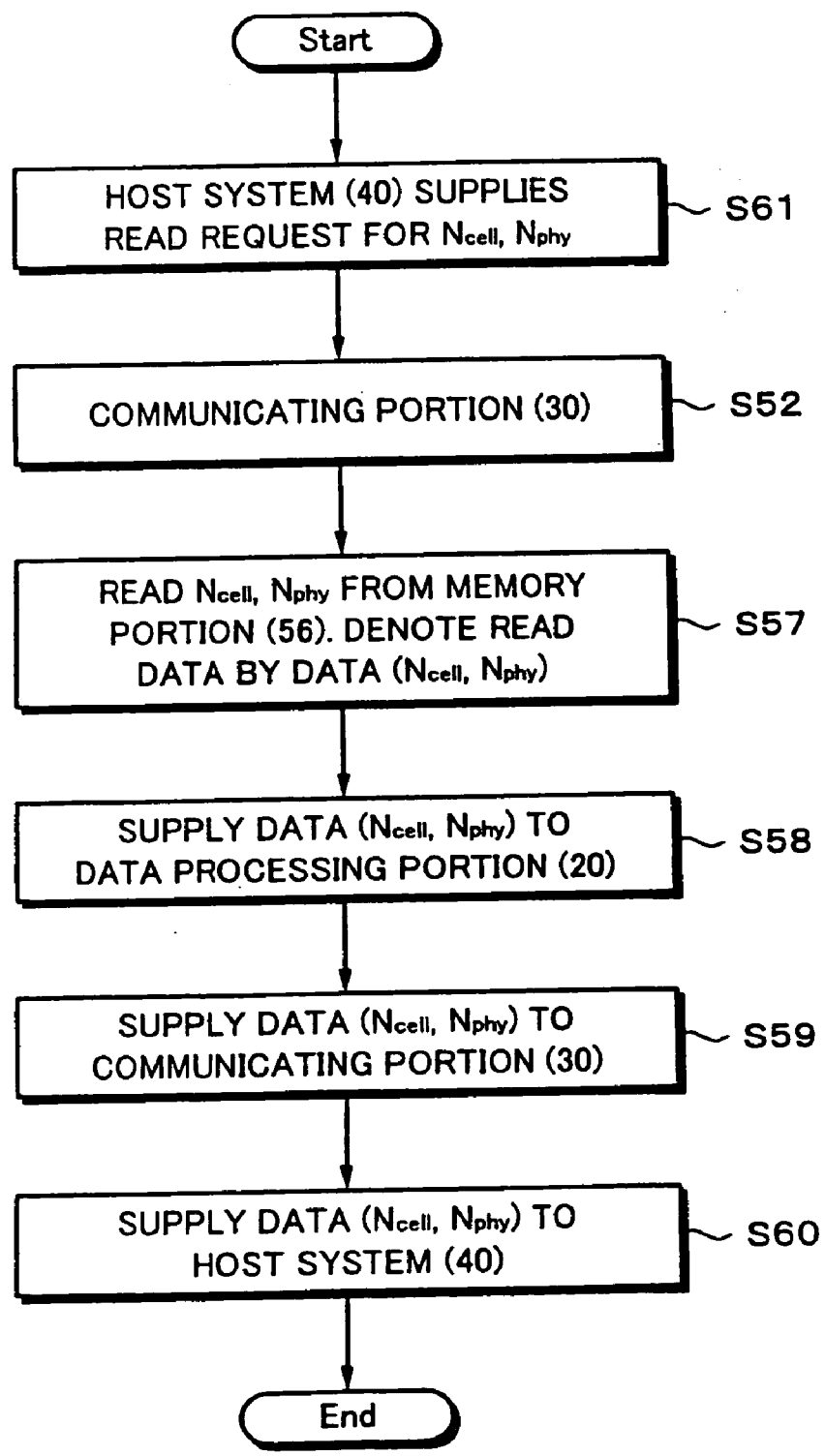
FIG. 16 is a flow chart showing an example of the read requesting process with physical information in the case that the unusable block correlation table is referenced by the host system.

FIG. 16 is a flow chart showing a data reading process with physical information $N_{cell}$, $N_{phy}$ supplied from the host system 40 in the system shown in FIG. 2. In the process shown in FIG. 16, the host system 40 performs a referencing process for the unusable block correlation table. Thus, in the process shown in FIG. 16, the referencing process for the unusable block correlation table shown in FIG. 15 (at steps S54, S55, and S56) is not required. Except for this point, the process shown in FIG. 16 is the same as the process shown in FIG. 15. For simplicity, in FIG. 16, similar steps to those in FIG. 15 are denoted by similar reference numerals and their description will be omitted.

Figure 17:
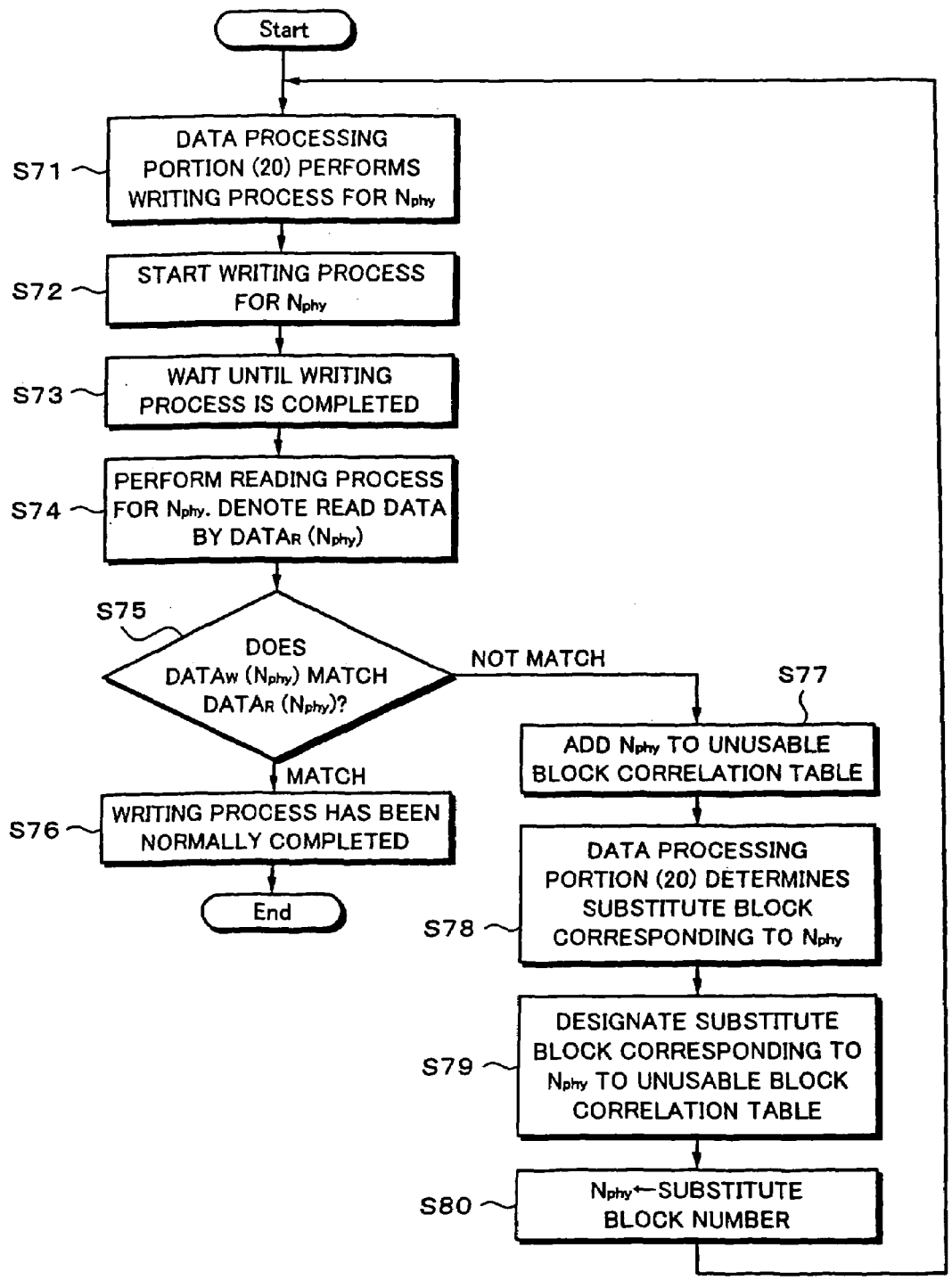
FIG. 17 is a flow chart showing an example of a verify process that determines whether or not a write error takes place and a process that adds the content of the unusable block correlation table.

FIG. 17 is a flow chart for explaining a function that performs a verifying process that verifies whether or not a writing process requested by the host system 40 has been correctly completed. At step S71, the data processing portion 20 performs a writing process for the physical block number $N_{phy}$ to the memory portion 50. The writing process is performed in the same manner as the forgoing reading process. At step S72, the writing process starts. At step S73, the data processing portion 20 waits until the writing process is completed.

Immediately after the writing process is completed, the reading process is performed with the physical block number $N_{phy}$ (at step S74). The read data is denoted by $DATA_R$ ($N_{phy}$). At step S75, $DATA_R$ ($N_{phy}$) is compared with $DATA_W$ ($N_{phy}$) (write data). When they match, assuming that the writing process has been normally completed, the process is completed (at step S76).

When the determined result at step S75 represents that the read data matches the write data, it is determined that the writing process has not been normally performed. At step S77, the physical block number $N_{phy}$ is added to the unusable block correlation table. At step S78, the data processing portion 20 decides a substitute block corresponding to the physical block number $N_{phy}$. At step S79, the substitute block is designated as a content of the unusable block correlation table. At step S80, the physical block number $N_{phy}$ is substituted with the designated substituted block number. Thereafter, the flow returns to step S71.

It should be noted that the present invention is not limited to the forgoing embodiment. In other words, without departing from the spirit of the present invention, various modifications and applications of the forgoing embodiment are available. For example, when the contents of the unusable block correlation table have been sorted in the ascending order, it is determined whether or not a physical block number of a block to be processed is larger (smaller) than ½ of the maximum physical block number. Corresponding to the determined result, the determination order of whether or not an objective block is an unusable block may be selected. In other words, the ascending order or descending order is selected.

According to the present invention, since the correlation table does not contain logical information and physical information for all blocks, the storage capacity of the irreversibly write memory open to the user can be increased. In addition, according to the present invention, since a conversion between logical information and physical information can be performed by a calculation, even if mapping information is lost, data can be accessed to some extent.

The invention claimed is:

1. A method of managing data stored in a memory apparatus having an irreversibly writeable memory, said method comprising:
   receiving a request from a host processor for data stored at a logical address;
   calculating a physical address in the irreversibly writeable memory from the logical address using a fixed mathematical relation;
   providing a block correlation table that includes block addresses of only unusable block portions in the irreversibly writeable memory and addresses of substitute block portions in the irreversibly writeable memory each associated with a specific one of the block addresses of the unusable block portions;
   comparing the physical address with the block addresses in the block correlation table;
   referencing the irreversibly writeable memory to read data stored at the physical address when the physical address does not match any of the block addresses in the block correlation table and referencing the irreversibly writeable memory to read data stored at the address of its associated substitute block portion when the physical address matches one of the block addresses in the block correlation table; and
   transmitting the read data to the host processor.

2. A method as set forth in claim 1, wherein said calculating step is performed by the memory apparatus.

3. A method as set forth in claim 1, wherein said calculating step is performed by a host system connected to the memory apparatus.

4. A method as set forth in claim 1, wherein said calculating step includes calculating the physical address as a function of the logical address, a multiplier value, and a base value.

5. A method as set forth in claim 4, wherein the base value and the multiplier value are stored as mapping reference information in the memory apparatus.

6. A method as set forth in claim 1, wherein said calculating step includes calculating the physical address using the mathematical relation:

$$N_{phy}=(N_{log} \times N_{mul})+N_{base},$$

where $N_{phy}$ is the physical address, $N_{log}$ is the logical address, $N_{mul}$ is a multiplier value, and $N_{base}$ is a base value.

7. A method as set forth in claim 1, wherein the irreversibly writeable memory includes a plurality of cells, and said calculating step includes calculating a cell number and the physical address as functions of the logical address, a base value, a multiplier value, and a designated value per cell.

8. A method as set forth in claim 7, wherein said calculating step includes calculating the physical address using the mathematical relation:

$$N_{phy}=((N_{log} \times N_{mul})+N_{base}) \% N_{blknum},$$

and calculating the cell number using the mathematical relation:

$$N_{phy}=((N_{log} \times N_{mul})+N_{base})/N_{blknum},$$

where $N_{phy}$ is the physical address, $N_{log}$ is the logical address, $N_{mul}$ is a multiplier value, $N_{base}$ is a base value, $N_{blknum}$ is a designated value per cell, and % defines a remainder value after division by $N_{blknum}$.

9. A method as set forth in claim 1, wherein the irreversibly writeable memory includes a plurality of cells, and the block correlation table includes the block addresses and cell numbers of only the unusable block portions and the addresses and cell numbers of their associated substitute block portions.

10. A method as set forth in claim 1, wherein the block addresses of the block correlation table are sorted in an ascending order or in a descending order, and said comparing step includes comparing the physical address with each of the block addresses until either the physical address matches a current one of the block addresses, the physical address is smaller than or equal to the current one of the block addresses when the block addresses are sorted in the ascending order, or the physical address is greater than or equal to the current one of the block addresses when the block addresses are sorted in the descending order.

11. A method as set forth in claim 1, wherein, when the physical address does not match any of the block addresses in the block correlation table, said method further includes:
   writing data into the irreversibly writeable memory at the physical address,
   verifying that the data has been correctly written at the physical address, and
   when the data has not been correctly written:
   inserting the physical address into the block correlation table as a block address of another unusable block portion,
   associating an address of another substitute block portion in the irreversibly writeable memory with the block address of the another unusable block portion, and
   writing the data into the irreversibly writeable memory at the address of the another substitute block portion.

* * * * *

UNITED STATES PATENT AND TRADEMARK OFFICE
CERTIFICATE OF CORRECTION

PATENT NO. : 7,296,119 B2  Page 1 of 1
APPLICATION NO. : 11/115713
DATED : November 13, 2007
INVENTOR(S) : Junko Sasaki It is certified that error appears in the above-identified patent and that said Letters Patent is hereby corrected as shown below:

On the title page, item [63], line 2, after "6,889,287", insert --which is a 371 of PCT/JP01/08971, filed on October 12, 2001.--

Signed and Sealed this

Eleventh Day of November, 2008

JON W. DUDAS
*Director of the United States Patent and Trademark Office*